Patented July 13, 1943

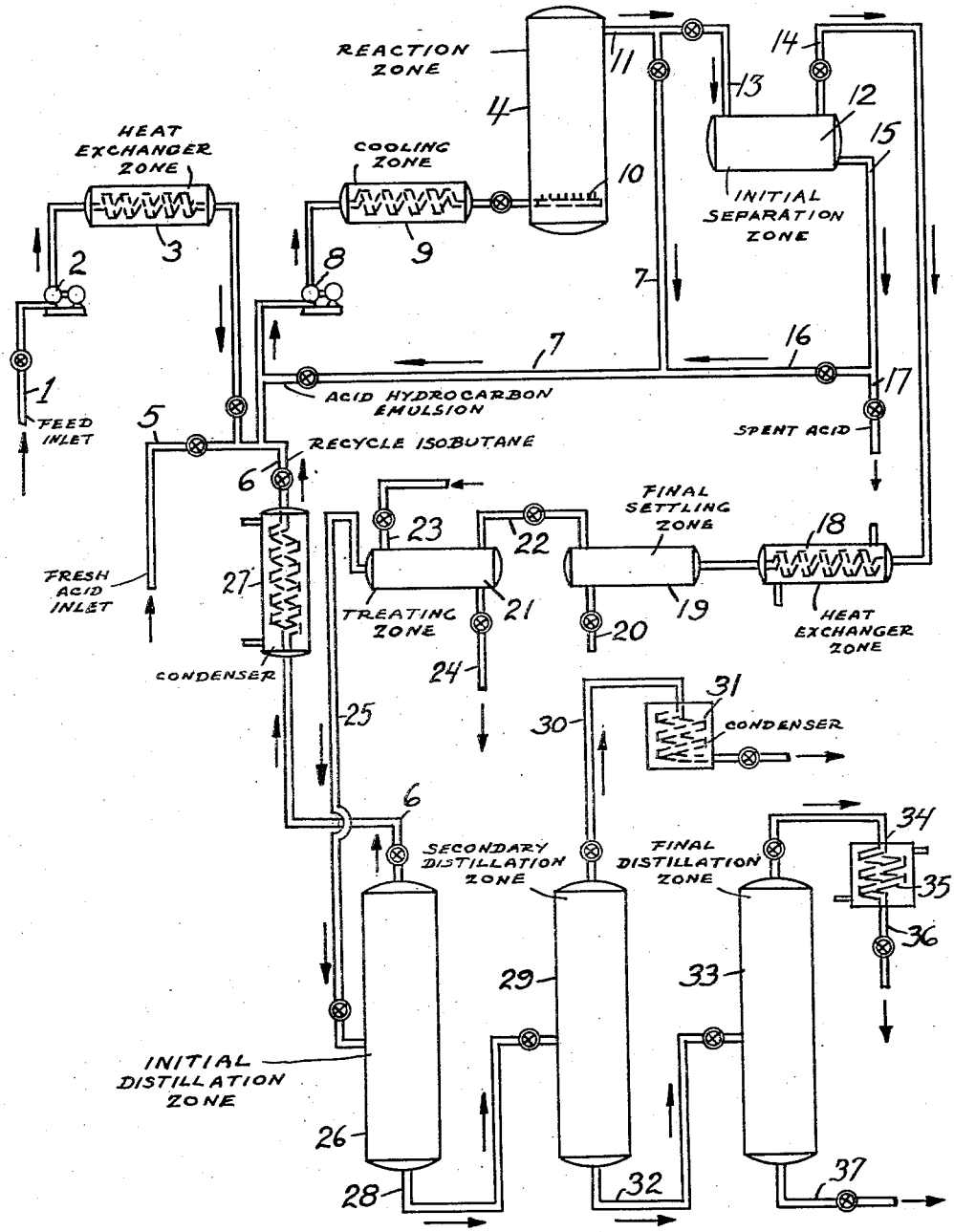

2,324,099

UNITED STATES PATENT OFFICE 2,324,099

ALKYLATION PROCESS

Ralph Burgess Mason, Baton Rouge, La., assignor to Standard Oil Development Company, a corporation of Delaware Application August 1, 1941, Serial No. 404,992

3 Claims. (Cl. 260—683.4)

The present invention is concerned with refining of mineral oils. The invention is more particularly concerned with an improved alkylation process for the production of hydrocarbon constituents boiling in the motor fuel boiling range from relatively lower boiling hydrocarbon constituents by a reaction which involves the condensation of hydrocarbons containing a tertiary carbon atom in the molecule with other hydrocarbon constituents. In accordance with the present process, the alkylation operation is conducted, employing a conventional mineral acid catalyst, in the presence of an added alkyl metal compound.

It is known in the art to react hydrocarbon constituents containing a tertiary carbon atom, hereinafter referred to as tertiary hydrocarbons, with olefins under conditions to form higher boiling hydrocarbon constituents. This reaction generally known as an alkylation operation is conducted in the presence of a suitable catalyst such as aluminum chloride or concentrated mineral acids. Usually the catalyst employed comprises a sulfuric acid having an acid concentration in the range from about 80% to about 100%, preferably from about 90% to about 100%. The reaction temperatures vary widely and are in the general range from about −20° F. to 100° F., and higher. However, preferred temperatures are in the range from about 30° F. to about 70° F. The time of the reaction varies considerably but in general is in the range from about 5 minutes to about 2½ hours, or longer, depending upon operating conditions. In general, the time of contact is in the range from about 10 minutes to about 60 minutes. In operations of this character equal molecular quantities of the isoparaffins and olefins may be utilized. However, it has been found that it is desirable to maintain a substantial excess of a tertiary hydrocarbon in the reaction zone and to operate in a reaction medium containing an excess of the catalyst composition. For example, in an operation wherein isobutane or isopentane is employed as the isoparaffinic reactant the mol ratio ranges from 1 to 50 and above 200 of isoparaffins per mol of olefins present. I have now discovered that providing an alkyl metal compound be used in conjunction with the mineral acid catalyst unexpected desirable results are secured.

My invention may be readily understood by reference to the attached drawing illustrating one embodiment of the same. Referring specifically to the drawing, it is assumed for the purpose of illustration that the feed comprises a refinery butane cut comprising butane, isobutane, isobutylene, alpha butylene, and beta butylene. The feed is introduced into the system by means of line 1 and pump 2, and passed through heat exchanging zone 3 wherein the temperature of the feed is lowered to the desired degree. The feed is mixed with about 5 cc. of tetraethyl lead per gallon based on fresh feed and combined with fresh catalyst comprising 90% to 98% concentrated sulfuric acid, with recycled acid hydrocarbon emulsion, and with recycled isobutane, which latter streams are produced as hereinafter described. The fresh catalyst is introduced by means of catalyst feed line 5, the recycled isobutane by means of line 6, and the recycled acid hydrocarbon emulsion by means of line 7. For the purpose of description, it is assumed that the fresh catalyst comprises sulfuric acid of about 90% to about 95% concentration. The mixture is passed by means of pump 8 through cooling zone 9 and introduced into reaction zone 4 by suitable jets or equivalent dispersing means 10. Turbo mixers, orifice mixers, or mechanical agitators may be employed. Cooling zone 9 preferably comprises a propane cooler or other equivalent means which is regulated to control the temperature of the mixture entering reaction zone 4. Usually the temperature of the mixture entering reaction zone 4 is in the range from about 15° F. to about 125° F., preferably at a temperature in the range from about 35° F. to about 70° F. In general, the lower the temperature of alkylation the lower will be the acid consumption. The reaction mixture flows upwardly through reaction zone 4 which may contain suitable dispersing and distributing means as, for example, pierced plates, baffle plate arrangements, pack masses, or other equivalent means. Conditions are adjusted so as to secure the desired reaction time in reaction zone 4. The reaction mixture is withdrawn from reaction zone 4 by means of line 11 and segregated into two streams. One stream is recycled to the reaction zone by means of line 7 while the other stream is passed to initial separation zone 12 by means of line 13. The manner in which the stream withdrawn from reaction zone 4 is segregated may vary considerably. However, for the purpose of description it is assumed that approximately 2% to 25% of the stream removed from reaction zone 4 is passed into initial separation zone 12. Temperature and pressure conditions in zone 12 are adjusted to secure the formation of a hydrocarbon phase which is removed from zone 12 by means of line 14 and an acid phase which is removed by means of line 15. A portion of the acid withdrawn from line 15 is recycled to zone 4 along with the acid hydrocarbon emulsion by means of line 16 while the remainder is withdrawn from the system as spent acid by means of line 17. The amount of acid withdrawn will vary considerably depending upon the related operating conditions. However, for the purpose of description it is assumed that sufficient acid is added to the acid hydrocarbon emulsion by means of lines 5 and 16 so as to maintain a ratio of acid to hydrocarbon of approximately 1 to 1. The hydrocarbon phase comprising normal butane, isobutane, and total alkylate withdrawn from settler 12 by means of line 14 is passed through heat exchanging zone 18 and introduced into a final separation zone 19 wherein any entrained acid is separated and removed by means of line 20. The hydrocarbon layer is passed into alkaline washing zone 21 by means of line 22 wherein the same is contacted with a suitable alkaline reagent which is introduced by means of line 23 and withdrawn by means of line 24. For the purpose of description it is assumed that the alkaline reagent comprises a sodium hydroxide solution. The soda washed hydrocarbon phase is withdrawn from treating zone 21 by means of line 25 and introduced into an initial distillation zone 26, which for the purpose of description is termed an isobutane tower. Temperature and pressure conditions are adjusted in zone 26 to remove isobutane overhead by means of line 6, which stream is condensed in condensing zone 27 and recycled with the feed to reaction zone 4 as hereinbefore described. The bottoms stream withdrawn from zone 26 by means of line 28 comprising normal butane and total alkylate is introduced into a secondary distillation zone 29, which for the purpose of description is termed a normal butane tower. Temperature and pressure conditions are adjusted to remove normal butane overhead by means of line 30, which stream is condensed in condensing zone 31 and further refined or handled as desired. In general, this stream is passed to motor fuel blending. The bottoms from secondary distillation zone 29 withdrawn by means of line 32 comprising the total alkylate is passed to a final distillation zone 33 wherein the same is fractionated to secure the desired product. Temperature and pressure conditions are adjusted in zone 33 to remove overhead by means of line 34 a hydrocarbon product having a final boiling point of about 290° F. to about 320° F. and an octane number in the range from about 90 to about 95. This overhead stream is condensed in condensing zone 35 and withdrawn from the system by means of line 36. The bottoms product withdrawn by means of line 37 comprises a fuel boiling in the range from about 320° F. to 500° F. and has an octane number in the range from about 75 to about 85. This material is further refined or handled in any manner desired.

The process of my invention may be widely varied. The invention essentially comprises utilizing in conjunction with the alkylating mineral catalyst an alkyl metal compound. The alkyl metal compound of my invention which is used in conjunction with the mineral acid catalyst may comprise a wide variety of substances such as alkyl metal compounds which are susceptible to decomposition resulting in the formation of free radicals. Substances of this class are, for example, metals of group 4 of the periodic table, such as lead, tin, and germanium, as well as zinc. However, the preferred alkyl metal compound comprises tetraethyl lead.

Although my alkyl metal compounds may be used in conjunction with any mineral acid alkylation catalyst, they are particularly desirable for use in conjunction with concentrated sulfuric acid. The amount of alkyl metal compound added will vary considerably depending upon the characteristics of the feed stock. In general, I prefer to add from about 1 to about 10 cc.'s of the alkyl metal compound per gallon of tertiary hydrocarbon olefin mixture. The alkyl metal compound may be directly added to the acid but in general I prefer to add the same to the feed oil.

In order to illustrate my invention further, the following example is given which should not be construed as limiting the same in any manner whatsoever:

Example

A number of operations were conducted. In one operation the catalyst consisted of sulfuric acid having a concentration in the range from about 90% to about 98%. In a second operation approximately 5 cc.'s of tetraethyl lead per gallon of isobutylene mixture was utilized in conjunction with the sulfuric acid catalyst. The results of these operations were as follows:

| Operation | 1 | 2 |
|---|---|---|
| Temperature °F | 15 to 40 | 15 to 40 |
| Time of reaction hours | 3.0 | 2.5 |
| Time of feed addition do | 3.0 | 2.0 |

| Feed | Isobutane-Isobutylene mixture +5 cc. of tetraethyl lead per gallon | Isobutane isobutylene |
|---|---|---|
| Wt. % i-C$_4$H$_8$[1] | 47.0 | 45.2 |
| Ratio: isobutane/olefin | 1.1 | 1.2 |
| C$_5$+ product: | | |
| Wt. % yield on olefins | 156 | 123 |
| Vol. % C$_5$–C$_7$ | 11.6 | 18 |
| Bromine No | 1 | 1 |
| Vol. % C$_8$ | 35.4 | 14 |
| Bromine No | 1 | 1.5 |
| Vol. % C$_9$+ | 53.0 | 68 |
| Bromine No | 18 | 60 |
| Octane No. of C$_5$–C$_8$ cut, A. S. T. M | 91 | |

[1] Denotes hydrocarbon constituents containing approximately designated number of carbon atoms in the molecule.

From the above, it is apparent that a decided improvement in yield is secured when employing the catalyst of the present invention. Furthermore a higher proportion of alkylate boiling in the desired C$_8$ range is obtained. In addition, the product obtained in accordance with our process is more highly saturated as evidenced by the lower bromine number.

Although a relatively low isoparaffin to olefin ratio was utilized in the above example, it is to be understood that higher ratios may be employed. In order to minimize the amount of recycle of hydrocarbons required it is desirable to keep this ratio at as low a volume as is consistent with good yields of alkylate having the desired boiling range. The ratio of isoparaffins to olefins may vary in the range from about 1:1 to about 10:1. In general, it is desirable to use higher ratios than those disclosed in the example so that a higher proportion of alkylate in the C$_8$ range is obtained.

What I claim as new and wish to protect by Letters Patent is:

1. Process for reacting tertiary isoparaffin hydrocarbons with olefins which comprises contacting the same in the presence of a catalyst comprising sulfuric acid and an alkyl metal compound.

2. Process as defined by claim 1 in which said acid is a sulfuric acid having a concentration in the range from about 90% to about 100% and in which said alkyl metal compound is tetraethyl lead.

3. Process for the production of hydrocarbon constitutents boiling in the motor fuel boiling range from relatively lower boiling hydrocarbons which comprises reacting tertiary isoparaffin hydrocarbons with olefins, utilizing a 90% to 100% sulfuric acid catalyst and tetraethyl lead.

RALPH BURGESS MASON.